Patented Nov. 3, 1953

2,658,084

UNITED STATES PATENT OFFICE 2,658,084

METHOD FOR RECOVERY OF NITROFORM FROM A REACTION MIXTURE CONTAINING NITRIC ACID AND NITROFORM

Gustav Allan Wetterholm and Ernst Lennart Nilsson, Gyttorp, Sweden, assignors to Nitroglycerin Aktiebolaget, Gyttorp, Sweden, a Swedish company No Drawing. Application August 25, 1952,
Serial No. 306,286

Claims priority, application Sweden
August 28, 1951

6 Claims. (Cl. 260—644)

The present invention concerns a method for recovery of nitroform in pure or practically pure state from a reaction mixture containing principally concentrated nitric acid and nitroform.

Nitroform can be produced according to known methods by introducing acetylene gas into concentrated nitric acid (Orton and McKee, J. C. S., 1920) under catalysis with mercury salts. In this manner a solution is obtained, which contains approximately 70–90% nitric acid, 5–11% nitroform, the remaining being water, small amounts of oxalic acid, nitrose etc.

On account of the great similarity between nitroform and nitric acid, the production of the former in pure form meets with considerable difficulties. Thus it is not possible to isolate nitroform by direct distillation, as a mixture of nitroform and nitric acid, or nitric acid alone at the beginning, passes over. Precipitation or freezing out methods have so far not found technical application. Extraction of the nitroform with liquid nitrogen dioxide, which has also been proposed, is connected with considerable difficulties and has hitherto not been carried out technically.

The above mentioned difficulties are obviated by the present invention. This invention is based on the rather surprising discovery, that, if the content of nitric acid in the reaction mixture is reduced to below the concentration, which corresponds to the constantly-boiling or azeotropic mixture of nitric acid and water, the nitroform may then be distilled off giving a distillate, which is free or practically free from nitric acid. The distillation is suitably carried out in a partial vacuum, for example at 100–200 mm. Hg, so as to prevent a partial decomposition of nitroform and nitric acid.

The conditions, on which the process according to the invention are based, will be apparent from the following statements. Nitric acid-water has, when pure, a maximal azeotrope at a concentration of 68% by weight of $HNO_3$ and 32% of water. If the relation $HNO_3:H_2O$ in the reaction mixture is richer in nitric acid than that, which corresponds to the composition of the azeotrope, concentrated nitric acid will distill over. If the relation approximately corresponds to the composition of the azeotrope, a mixture of nitric acid-water-nitroform will distill over. If on the other hand less nitric acid is present than in accordance with this relation, nitroform-water will distill over, free from nitric acid or only containing traces thereof, while the contents of the still will be free or practically free from nitroform.

The reduction in the contents of nitric acid in the reaction mixture to the desired concentration may be effected either by direct dilution with water or in such a way, that nitric acid is distilled off first and until the azeotropic composition is approximately obtained and the solution then diluted with a small amount of water. This latter manner of working is especially advantageous, as will be shown below.

The nitroform-water mixture obtained by the distillation divides itself during condensation into two layers due to the fact that nitroform and water are only partially soluble in one another and cannot mix in all proportions. The upper strongly yellow-coloured layer contains 35–45% nitroform and is free, or nearly free from nitric acid, while the lower layer contains 90–95% nitroform, free from or only with traces of nitric acid.

The nitroform thus obtained may by re-crystallisation, for example from carbon tetrachloride, be obtained in crystallized condition in the form of long white needles with a melting point of 28° C.

For recovering nitric acid from the reaction mixture it is of special importance that, as has been mentioned above, it has been proved possible, by the use of fractional distillation in columns, first to remove from the reaction mixture that part of the nitric acid, which exceeds the amount of $HNO_3$ corresponding to the relation of 68% $HNO_3$ to 32% $H_2O$, after which the remaining solution is diluted with a suitable amount of water, as previously indicated, whereafter the distillation can take place.

Example 1

By nitration of acetylene with concentrated nitric acid a solution was obtained, which was first relieved from nitrose. It then had the following composition: 10.5% nitroform, 74.8% $HNO_3$, 1.0% $HNO_2$, 1.2% oxalic acid and 12.5% water. By column distillation of this solution under a pressure of 200 mm. Hg a distillate was obtained containing 97.8% $HNO_3$, 1.8% tetranitromethane and the rest water. The boiling temperature in the still was about 85° C. and that of the departing gases 45–50° C. The composition of the remaining solution in the still was 18.2% nitroform, 56.2% $HNO_3$, 0.6% $HNO_2$, 1.6% oxalic acid and the rest water (23.4%). The relation nitric acid-water was here 2.41 as against 2.13 in a constantly-boiling mixture of only nitric acid and water (68:32). This depends on the fact, that it is practically impossible to distill off from the reaction mixture sufficient concentrated nitric acid to make the nitric acid content of the still correspond exactly with the composition of the azeotrope nitric acid-water. Of the amount of nitroform supplied 95% was found in the still after discontinuation of the distillation, while 50% of the nitric acid had distilled over.

The contents of the still was now diluted with enough water to make the composition: 14.5% nitroform, 46.5% $HNO_3$ and 39.0% water apart from oxalic acid and traces of nitrous acid. When this solution was distilled in the column a distillate (in two phases) was obtained with a total composition of 47% nitroform, 52.5% water and 0.5% $HNO_3$. The solution remaining in the still contained 68.0% $HNO_3$, 31.8 $H_2O$ and 0.2% nitroform.

The recovery of nitroform obtained by the distillation amounted to 95.5%, and of the nitric acid remaining in the still 98% was recovered. These yields which were obtained under laboratory conditions can naturally be improved upon by the use of larger apparatus. The distillation could then be carried out in a continuous way.

If the contents of the still after the first distillation had been distilled again without previous addition of water, a distillate with the composition: 41.5% nitroform, 41.5% $HNO_3$ and 17.0% water would have been obtained with a remainder in the still containing 68.0% $HNO_3$, 32% $H_2O$ and a small amount of nitroform.

*Example 2*

In a nitration experiment a solution was obtained with a composition of 9.2% nitroform, 72.4% $HNO_3$, 5.7% $HNO_2$, 1.1% oxalic acid and the rest water. After addition of 30% water based on the total volume of the solution and simultaneous blowing of air therethrough, a solution was obtained having a content of 7.82% nitroform, 56.2% $HNO_3$, the rest being water, oxalic acid and traces of nitrose.

By distillation of this solution a distillate was obtained containing 51.6% nitroform, 1.0% $HNO_3$ and the rest water, while the composition of the remaining solution in the still amounted to 68.35% $HNO_3$, 0.01% nitroform, the rest water, oxalic acid etc. The recovery of nitroform by the distillation was 95.9% and of $HNO_3$ in the still, 98.8%. During condensation the distillate separated into two layers, an upper one containing 40.5% nitroform, 0.01% $HNO_3$ plus some water, and a lower one containing 90.0% nitroform and 0.0% $HNO_3$.

We claim:

1. A method of recovering nitroform from a reaction mixture containing concentrated nitric acid and nitroform, which comprises reducing the content of nitric acid in the mixture down below the concentration which corresponds to an azeotropic mixture of nitric acid and water, distilling the mixture thus obtained, whereby vapours of practically pure nitroform and water pass over, condensing the vapours, and then recovering the nitroform from the distillate thus obtained.

2. The method according to claim 1, wherein the distillation is carried out in a partial vacuum.

3. A method of recovering nitroform from a reaction mixture containing concentrated nitric acid and nitroform, which comprises removing from the mixture by fractional distillation in columns substantially the excess of nitric acid over the nitric acid content of an azeotropic mixture of nitric acid and water, adding an amount of water sufficient to reduce the content of nitric acid in the mixture below the azeotropic concentration, distilling the mixture thus obtained, whereby vapours of practically pure nitroform and water pass over, condensing the vapours, and then recovering the nitroform from the distillate thus obtained.

4. A method of recovering nitroform from a reaction mixture containing concentrated nitric acid and nitroform, which comprises adding directly to the reaction mixture an amount of water sufficient to reduce the content of nitric acid present therein below the content of nitric acid in an azeotropic mixture of nitric acid and water, distilling the mixture thus obtained, whereby vapours of practically pure nitroform and water pass over, condensing the vapours, and then recovering the nitroform from the distillate thus obtained.

5. A process for producing pure nitroform, which comprises reacting acetylene with concentrated nitric acid, removing from the reaction mixture by fractional distillation in columns substantially excess of nitric acid present therein over the nitric acid content of an azeotropic mixture of nitric acid and water, adding an amount of water sufficient to reduce the content of nitric acid in the mixture below the azeotropic concentration thereof, distilling the mixture thus obtained in a partial vacuum, whereby vapours of practically pure nitroform and water pass over, condensing the vapors, and then recovering the nitroform from the distillate thus obtained.

6. The process of claim 5 wherein the distillation is carried out in a partial vacuum amounting to 100–200 mm. Hg.

GUSTAV ALLAN WETTERHOLM.
ERNST LENNART NILSSON.

References Cited in the file of this patent

UNITED STATES PATENTS

| Number | Name | Date |
|---|---|---|
| 2,233,620 | Lippincott | Mar. 4, 1941 |
| 2,465,959 | Tindall | Mar. 29, 1949 |

OTHER REFERENCES

Chemical Abstracts, vol. 24, page 3485: Quilico and Freri, "Action of Nitric Acid on Acetylene," citing Gazz. Chim. Ital., 59:930–41.

Chemical Abstracts, vol. 44, page 1009: Hager, "Tetranitromethane," citing Ind. Eng. Chem., 41:2168–7.